April 23, 1963 W. H. MORGAN 3,086,306

ELECTROMAGNETIC INDICATOR

Filed July 10, 1959 2 Sheets-Sheet 1

April 23, 1963 W. H. MORGAN 3,086,306
ELECTROMAGNETIC INDICATOR
Filed July 10, 1959 2 Sheets-Sheet 2
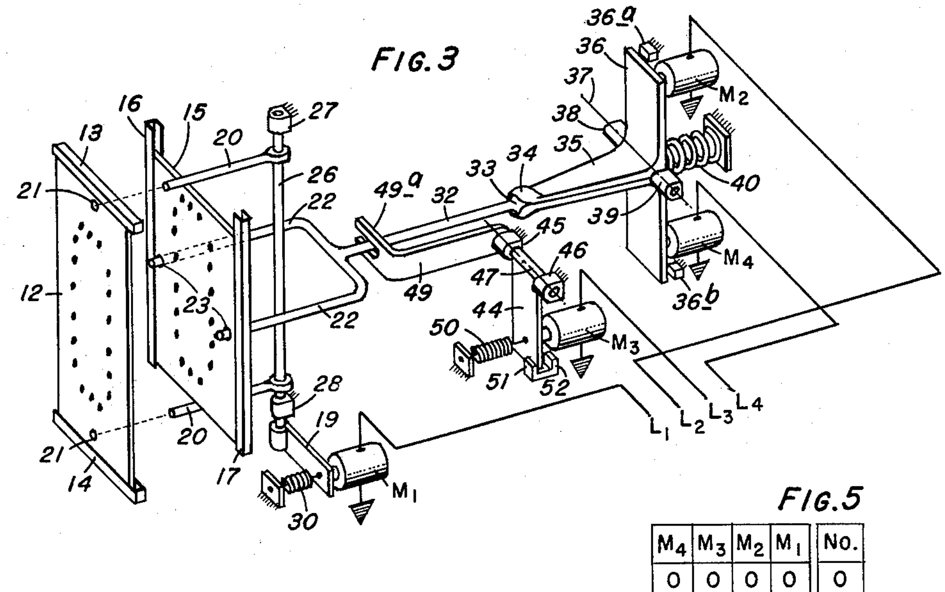
FIG. 3
FIG. 5
| $M_4$ | $M_3$ | $M_2$ | $M_1$ | No. |
|---|---|---|---|---|
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
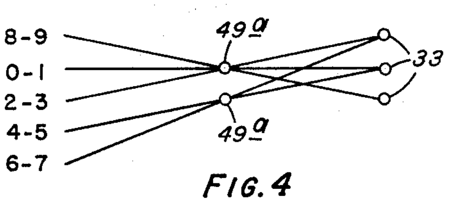
FIG. 4
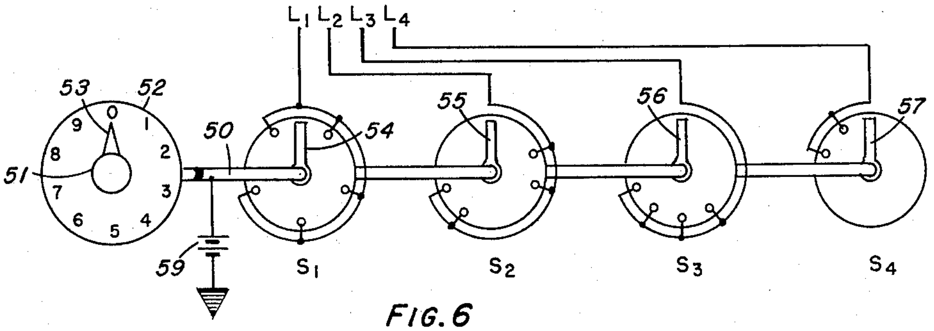
FIG. 6

1

3,086,306

ELECTROMAGNETIC INDICATOR

William H. Morgan, Glendale, Calif., assignor to The Bendix Corporation, a corporation of Delaware Filed July 10, 1959, Ser. No. 826,288

11 Claims. (Cl. 40—52)

This invention relates to electrically-actuated indicators for selectively displaying in a single frame any one of a plurality of digits or symbols, and is particularly useful for displaying any one of the ten numerical digits 0 to 9, respectively.

An object of the invention is to provide an indicator that is simple, can be built in very small or very large sizes, and has rapid response.

Another object is to provide an indicator that is directly responsive to multidigit binary code signals.

Other more specific objects and features of the invention will appear from the description to follow.

Briefly, one form of indicator in accordance with the invention comprises a pair of juxtaposed apertured screens movable with respect to each other into a plurality of discrete relative positions, the apertures being so located in the two screens that in each of the different relative positions a different combination of apertures register to define a different digit which is rendered visible by illumination from the rear. Alternatively, only the front screen may be apertured, and the rear screen may have frontal areas of contrasting appearance (with respect to the front surface of the front screen) instead of apertures, so that those of said areas registering with apertures in the front screen are rendered visible by frontal illumination. The different relative positions of the screens may be obtained by movement of one screen or both screens. In a decimal indicator having ten relative screen positions, one screen may be movable in one direction through five positions, and the other screen may be independently movable through two positions. The five positions of the one screen may be obtained by selective energization of three electromagnets, and the two positions of the other screen may be obtained by selective energization of the fourth electromagnet.

A feature of the invention is the energization of the first three magnets in accordance with the first three digits of a binary decimal code to select any one of the five pairs of odd and even numbers (0, 1), (2, 3), (4, 5), (6, 7), and (8, 9), and energization of the fourth magnet in accordance with the last (least significant) digit of the code to select the odd or even digit of the selected pair. This renders the invention particularly useful in digital code systems.

A full understanding of the invention may be had from the following detailed description with reference to the drawing, in which:

FIG. 3 is a schematic perspective view of the mechanism of the indicator.

FIG. 4 is a schematic diagram illustratng the mode of operation of the mechanism.

FIG. 5 is a table showing the mode of energization of the electromagnets of the mechanism.

FIG. 6 is a schematic diagram of a typical coding switch usable with the invention.

Figure 1:
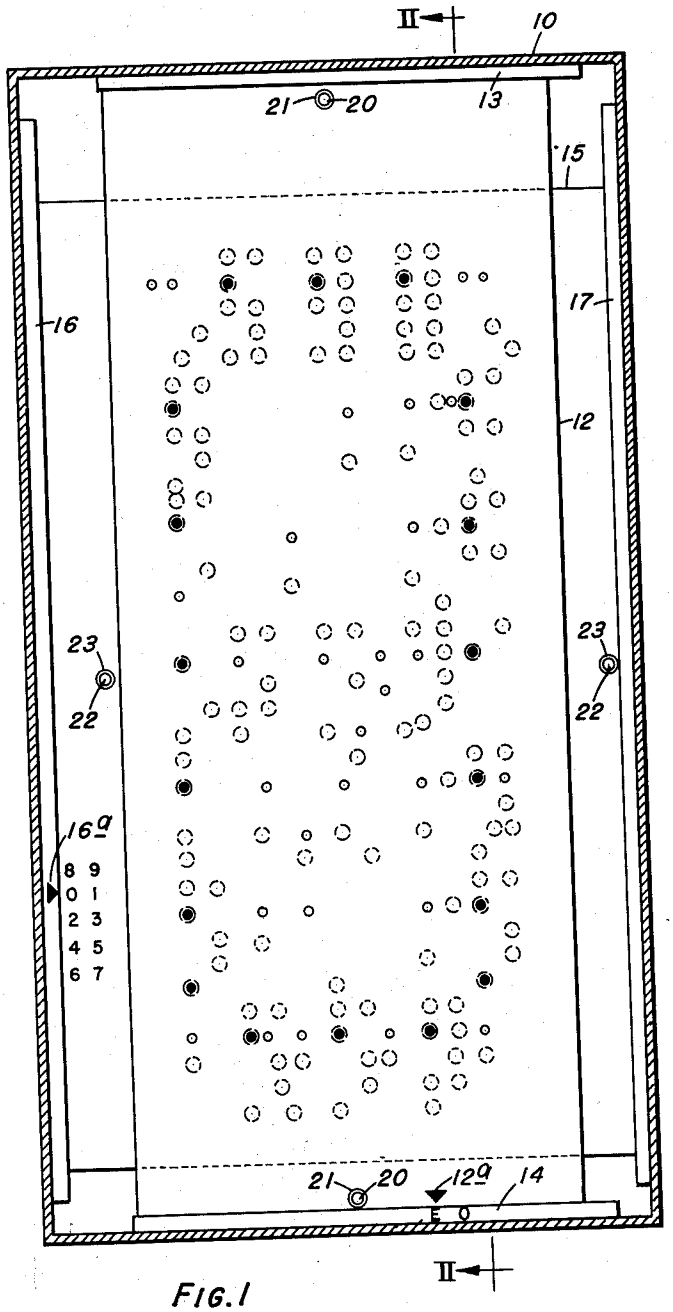
FIG. 1 is a front view of an indicator incorporating the invention with a portion of the frame removed, the view being taken in the plane I—I of FIG. 2.
Figure 2:
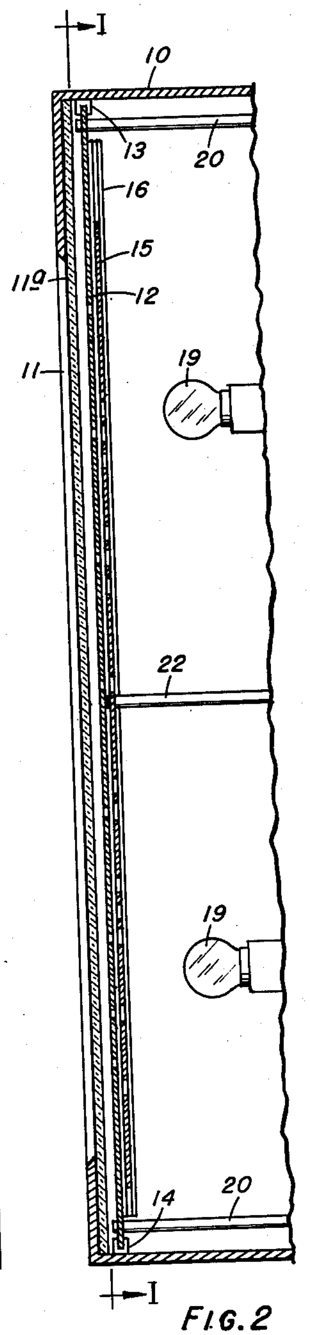
FIG. 2 is a section in the plane II—II of FIG. 1.

Referring to FIGS. 1 and 2, a case 10 having a front window 11 and a window glass 11*a* has positoned back of the window a front apertured screen 12 slidably supported in upper and lower channel guides 13 and 14 for horizontal movement, and a rear apertured screen 15 slidably supported in left and right channel guides 16 and 17 for vertical movement. For convenience of illustration, the apertures of the front screen are shown as small circles, and the apertures of the rear screen are shown as larger circles. In practice, the apertures can be of the same or different sizes and shapes, but it is convenient and desirable to have the front screen apertures circular and of uniform size.

2

The front screen 12 has two positions of rest indicated by the arrow 12*a* on the screen and the letters E (for even) and O (for odd) on the guide 14. The rear screen 15 has five positions of rest indicated by the arrow 16*a* on the guide 16, and the paired digits (8, 9), (0, 1), (2, 3), (4, 5) and (6, 7) on the screen. There are thus ten different possible relative positions of the two screens, and the apertures therein are so located that in each of the ten different relative positions different sets of apertures in the two screens register to define a different one of the ten digits 0–9, which digit is rendered visible by light transmitted through the registered apertures from lamps 19 back of the screens. In the positions of the screen shown, it will be seen that the registering apertures define the digit 0. If the front screen is shifted horizontally to its odd position, the next higher odd digit 1 will be displayed by registration of a different set of apertures. Each of the five vertical positions of the rear screen produces a different even digit or the next higher odd digit, depending upon whether the front screen is in its even or odd position.

The front screen is shifted horzontally between even and odd positions by a pair of rods 20, 20 extending from an actuating mechanism through apertures 21, 21 in the screen 12, and the rear screen 15 is shifted vertically between its five positions by a pair of rods 22, 22 extending from the actuating mechanism through apertures 23, 23 in the screen 15. The actuating mechanism, which may be positioned within the rear portion of the case 10, is shown in FIG. 3, which is a schematic diagram of the entire mechanism.

Referring to FIG. 3, the rods 20 for horizontally moving the front screen 12 are secured to a common fulcrum shaft 26 rotatably supported in upper and lower bearings 27 and 28 and having secured thereto the armature 29 of an electromagnet $M_1$. The armature 29 is urged away from the electromagnet $M_1$ by a spring 30 to normally retain the front screen 12 in its left limit position, which limit position may be determined by the guides 13 and 14 which have closed ends engageable with the corners of the screen. The front screen 12 is therefore in its left position when the electromagnet $M_1$ is not energized and is in its right position when the electromagnet is energized.

The rods or arms 22 for moving the rear screen 15 constitute forks on the forward end of a lever 32 having a ball 33 on its rear end engaged by a socket 34 on the forward end of an arm 35 extending from a single armature 36, the upper end of which is juxtaposed to an electromagnet $M_2$ and the lower end of which is juxtaposed to an electromagnet $M_4$. The armature 36 is supported by pivot bearings 38 and 39 for rocking movement about a horizontal axis 37. A centering spring 40 urges the armature 36 into a neutral position in which the opposite ends thereof are equally spaced from the respective electromagnets $M_2$ and $M_4$ when neither electromagnet is energized. Spring 40 is a helical compression spring of substantial diameter so that rocking movement of the armature in either direction from neutral position deflects the spring to an increased extent. The ball end 33 of the lever 32 therefore occupies a mid position when neither of the magnets $M_2$ and $M_4$ is energized, occupies an upper position when the magnet $M_2$ is energized, and occupies a lower position when the magnet $M_4$ is energized. The upper and lower positions are exactly determined by armature stops 36*a* and 36*b*.

The lever 32 is under the joint control of the electromagnets $M_2$ and $M_4$ and an electromagnet $M_3$ which has an armature 44 pivotally supported for rocking movement by pivots 45 and 46 about a horizontal axis 47. Secured to the armature 44 is a forwardly projecting arm 49 having a forked end 49*a* engaging the lever 32 forwardly of the ball end 33. The armature 44 is normally retained in position away from the electromagnet $M_3$ by a spring 50 which retains the armature 44 in a predetermined position determined by a stop 51. When the electromagnet $M_3$ is energized, the armature 44 is rocked into a second position determined by its engagement with a stop 52.

Various positions of the armature 36 and the armature 44 to move the rear screen 15 into any one of its five positions is shown by the diagram of FIG. 4. Thus, it will be observed that when all of the electromagnets $M_2$, $M_3$ and $M_4$ are de-energized, the forked end 49*a* of the arm 49 is in an upper position, and the rear ball end 33 of the lever 32 is in an intermediate position in which the screen 15 is in its (0, 1) position. If the ball end 33 is moved into its lower position by energization of the electromagnet $M_4$ while the electromagnet $M_3$ is de-energized, the screen 15 is moved into its uppermost or (8, 9) position. If while the electromagnet $M_3$ is still de-energized the ball end 33 is moved into its upper position by energization of the electromagnet $M_2$, the screen is moved into its intermediate or (2, 3) position. If while the ball 33 is in its intermediate position because electromagnets $M_2$ and $M_4$ are both de-energized, the electromagnet $M_3$ is energized to move the forked end 49*a* of arm 49 into its lower position, the screen is shifted into the (4, 5) position. If the ball end 33 of the lever 32 is then shifted into its upper position by energization of the electromagnet $M_2$, the screen is shifted into its lowermost (6, 7) position.

It will be observed that when electromagnet $M_2$ or $M_4$ is energized to shift the ball end 33 of the lever 32 about the fulcrum point 49*a*, the movement of the screen 15 is only half that resulting from the same movement of the lever by the electromagnet $M_3$ about the ball end 33 as the fulcrum. This desired result is inherent in the system, because in the first case the lever 32 is operating as a lever of the first class, whereas in the second case the lever is operating as a lever of the third class. However, if this were not true, the desired double movement in response to electromagnet $M_3$ could be obtained by varying the relative lengths of the arms 35 and 49, or adjusting the stops 36*a*, 36*b* relative to the stops 51, 52.

The relation between the condition of the electromagnets $M_1$–$M_4$ and the number displayed through the registering apertures in the screens is shown in the table of FIG. 5, in which a "0" or a "1" in the column under each electromagnet indicates that that electromagnet is de-energized or energized respectively. It will be observed that this table shows a well known binary decimal code in which the least significant digit ($M_1$) changes value for each successive number, and each of the other digits changes value half as often as its adjacent less-significant digit. Hence, the mechanism is directly responsive to a four-digit binary code to display the corresponding decimal digit, by simply connecting the four output lines of a source of binary code signals to the energizing lines $L_1$–$L_4$ of the four electromagnets $M_1$–$M_4$, respectively.

A simple circuit for generating such a code is shown in FIG. 6, in which a shaft 50 is adapted to be rotated by a knob 51 into any one of ten different positions corresponding to the decimal digits (0, 9) respectively, as indicated by a dial 52 and a pointer 53 on the handle 51. Mounted on the shaft 50 are the movable switch arms 54, 55, 56 and 57, respectively, of four switches $S_1$–$S_4$, respectively, having contacts connected to lines $L_1$–$L_4$, respectively. The four movable switch members 54–57 may be connected through the shaft 50 to a source of current 59 to energize the lines $L_1$–$L_4$ whenever the movable switch arms 54–57 are positioned on contacts connected to the lines $L_1$–$L_4$, respectively. The fixed contacts of the switches $S_1$–$S_4$ are so positioned about the shaft 50 that the lines $L_1$–$L_4$ are energized in accordance with the table of FIG. 5. Thus the line $L_1$ is energized in the decimal positions 1, 3, 5, 7 and 9; the line $L_2$ is energized in positions 2, 3, 6 and 7; the line $L_3$ is energized in positions 4, 5, 6 and 7; and the line $L_4$ is energized in positions 8 and 9.

Although for the purpose of explaining the invention a particular embodiment thereof has been shown and described, obvious modifications will occur to a person skilled in the art, and I do not desire to be limited to the exact details shown and described.

I claim:

1. An indicator for selectively displaying a plurality of symbols, one at a time, in the same space comprising:
   a first screen including a plurality of indicating and non-indicating portions;
   a second screen in juxtaposed relationship to the first screen and having indicating and non-indicating portions;
   said first and second screens having a plurality of discrete relative positions, the total number of relative positions being a function of the total number of symbols to be displayed;
   first motor means including an armature for displacing said first screen in a lateral direction from a normal to an operated position;
   second motor means having a plurality of energizing input connections and including armature means for moving said screen into a plurality of discrete positions in a direction at right angles to the direction of movement of said first screen to provide a plurality of discrete relative positions of said first and second screens dependent upon the combination of the electrical input conditions at the input connections to said first and second motor means, said first and second motor means being responsive to binary coded information for displacing said first and second screens;
   and means passing light through the cooperating indicating positions of said first and second screens to display selected symbols.

2. The combination in accordance with claim 1 wherein said second motor means comprises one motor including an armature movable to a first and a second position, said armature including an articulated portion connected to said second screen, and said second motor means also including another motor having an armature for displacing the articulated portion of said armature to move said second screen to a second pair of discrete positions.

3. The combination in accordance with claim 2 wherein said second motor means associated with said second screen includes a third motor for displacing a common armature with said one motor to a third position whereby said second screen is moved to any of six discrete positions on the operation of said first and second motor means.

4. An indicator for selectively displaying a plurality of symbols one at a time in the same space comprising: a first screen including a plurality of light passages therethrough, a second screen having a plurality of light passages therethrough, one motor means displacing said first screen in one direction in response thereto, a current impulse to another motor means including a plurality of motors for displacing said second screen to any of a plurality of discrete positions extending in a different direction in response to a combination of input pulses to said motors of said other motor means, means applying a combination of pulses to both of said motor means indicative of a particular symbol whereupon said first and second screens are displaced to a selected relative position, the light passages of said first and second screens in said selected position cooperating, upon the passage of light therethrough, to define the selected symbol.

5. The combination in accordance with claim 4 wherein said other motor means includes first and third motors having armatures for displacing said second screen to two extreme positions and a third intermediate position, and a second motor for shifting said second screen to a different region in which said first and third motors cooperate to position said screen in a fourth or fifth position whereby upon the operation of both of said motor means a total of ten relative positions of said first and second screens are established.

6. The combination in accordance with claim 5 wherein said first and third motors of said other motor means employ a common armature coupled to said second screen through an articulated member and said second motor includes an armature arranged to displace the articulated portion of the armature associated with said first and second relay means.

7. An indicator for selectively displaying the ten digits 0 to 9 in response to corresponding four digit binary code signals comprising: a pair of screens in juxtaposed relationship to each other having cooperating indicating and nonindicating portions differently located such that in five discrete relative positions of said screens in one direction different indicating portions of said pair of screens register or define the five even digits 0, 2, 4, 6 and 8 and in five discrete relative positions in said one direction but laterally displaced in a different direction, indicating portions of said screens register or define the five odd digits 1, 3, 5, 7 and 9; first binary signal responsive means for relatively positioning said screens in said one direction in accordance with the value of said three most significant digital signals, and second binary signal-responsive means for relatively positioning said first and second screens laterally in accordance with the least significant digital signals.

8. Apparatus in accordance with claim 7 wherein said first binary signal-responsive means comprises: first and second motors individually operable responsive to binary digits to move one of said screens to respective positions from an intermediate position and a third motor operative in response to a binary digit to move said screen to a different intermediate position whereby said screen is displaceable to any of six discrete positions dependent upon the operative condition of said first, second and third motors.

9. The combination in accordance with claim 8 wherein said second binary-responsive means comprises a motor displacing said other screen to either of two lateral positions whereupon twelve relative positions of said screens are produced depending upon the operative condition of said first and second binary-responsive means.

10. An indicator for selectively displaying a plurality of symbols one at a time in the same space comprising:

a first screen including a plurality of indicating and nonindicating portions, a second screen in juxtaposed relationship to the first screen and having indicating and nonindicating portions, said first and second screens having a plurality of discrete relative positions, the total number or relative positions being a function of the total number of symbols to be displayed;

a differential mechanism having an output element connected to one of said screens for selectively shifting said one screen into any one of said plurality of positions relative to the other screen and having first and second input elements differentially coupled to said output element such that an increment of movement applied to said second element produces substantially greater movement of said output element than does the same increment applied to the first input element;

said differential mechanism moving its said output element one increment from a base position in response to movement of said first input element through its fixed distance;

said differential mechanism moving its said output element a distance substantially greater than said one increment between different base positions in response to movement of said second input element through its fixed distance.

11. Apparatus according to claim 10 in which said differential mechanism comprises:

a lever one end of which constitutes said output element and the other end of which constitutes said first input element, said lever having a movable fulcrum constituting said second input terminal.

References Cited in the file of this patent

UNITED STATES PATENTS

| | | |
|---|---|---|
| 609,915 | Sibley | Aug. 30, 1898 |
| 1,114,267 | Jones | Oct. 20, 1914 |
| 1,172,360 | Hildburgh | Feb. 22, 1916 |
| 1,322,542 | Chauvet | Nov. 25, 1919 |
| 2,163,188 | Bosche | June 20, 1939 |
| 2,263,281 | Von Tadden | Nov. 18, 1941 |
| 2,823,344 | Ragland | Feb. 11, 1958 |
| 2,982,038 | Kass | May 2, 1961 |
| 2,989,680 | Weiser et al. | June 20, 1961 |